H. R. ROBBINS.
Cooking Range.
No. 90,583.
Patented May 25, 1869.
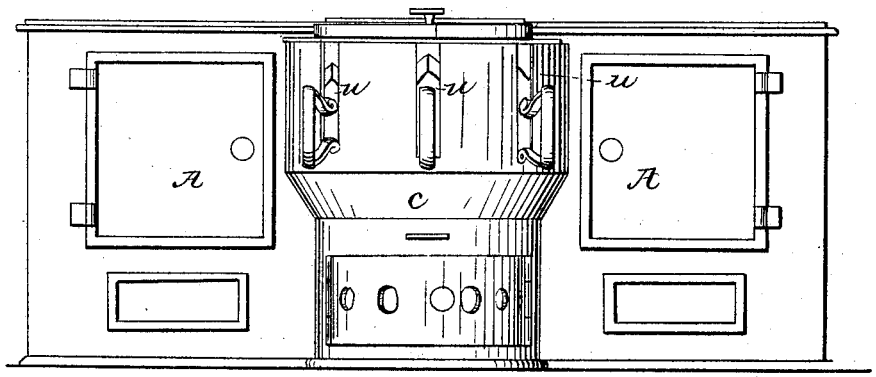
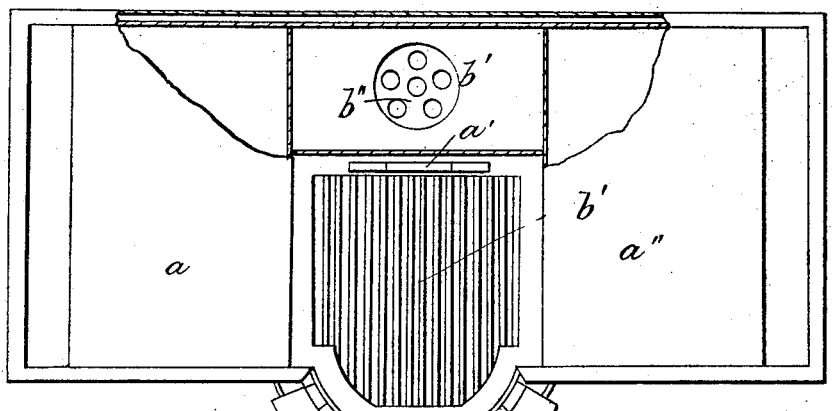

United States Patent Office.

HENRY R. ROBBINS, OF BALTIMORE, MARYLAND, ASSIGNOR HIMSELF AND J. J. MORAN, OF SAME PLACE.

Letters Patent No. 90,583, dated May 25, 1869.

COOKING-RANGE.

The Schedule referred to in these Letters Patent and making part of the same.

*To all whom it may concern:*

Be it known that I, HENRY R. ROBBINS, of the city and county of Baltimore, and State of Maryland, have invented a new and improved Cooking-Range, or Stove; and I do hereby declare that the following is a full, clear, and exact description of the construction and operation of the same, reference being had to the accompanying drawings, making a part of this specification, in which—

Figure 1 is a front view.

Figure 2 is a top view, a portion of it in section.

This invention consists in so combining an air-chamber with the ovens and fire-space of a cooking-range or stove, that the heat generated in the fire-space shall not only serve for the cooking of food, but also for the warming of air during its passage to other apartments in the house.

The invention also consists in making the central part of the front wall of the range with a swell, or bulge outward, whereby I gain an increase of surface in the swelled part itself, which I use for the heating of flat-irons, and also an increase of space in the oven, in rear of the said bulge.

In the drawings—

A is a cooking-range, divided into three transverse spaces, $a\ a'\ a''$.

The central space, $a'$, is further divided by a transverse partition into two chambers, $b$ and $b'$, whereof the outer chamber, $b$, is open at the top, and intended for cooking or warming-purposes, and the rear chamber, $b'$, is closed at the top, and contains a central fire-pot, $b''$, the remaining portions constituting a heating-space, into which cold air is admitted from the rear of the range, which, having been duly freighted with caloric during its passage through the heating-space, is conducted away, by means of pipes, to other apartments. My range is thus made to serve not only for cooking, but also for heating-purposes.

The front wall, $c$, of the central space $b$, I cause to be curved outward, as shown, and made with an inner and outer wall, leaving a narrow curved chamber, M, between the two walls, closed at the top by means of covers, into which I insert flat-irons, vertical slots, $u\ u$, being made in the outer wall to receive the handles of the flat-irons, as shown in fig. 1.

It is clear, that by making this flat-iron-heating space of the concave form, I gain room for the insertion of one or more additional irons; also, that I enlarge the area of the space $b$, and by such enlargement augment the capacity and increase the value of my apparatus; also, by this bulge, I gain one additional opening, for culinary purposes.

Having thus described my invention,

What I claim as new, and desire to secure by Letters Patent, is—

1. The vertical chamber M, when formed around the bulging front wall of a range or stove, as shown and described, and provided with the vertical slots $u\ u$, and with covers, substantially as and for the purposes specified.

2. The arrangement, in a stove or range, of the four chambers $a\ a''\ b\ b'$, the chamber $b$ containing a large grate, adapted for common use for cooking, &c., and the chamber $b'$, containing a small grate, $b''$, at its centre, and holes through its rear wall, by means of which cold air may be admitted, all constructed to operate as and for the purposes set forth.

HENRY R. ROBBINS.

Witnesses:
CHAS. A. PETTIT,
A. M. TANNER.